(12) United States Patent
Zou et al.

(10) Patent No.: US 12,204,985 B2
(45) Date of Patent: Jan. 21, 2025

(54) COMPUTER-BASED SYSTEMS AND/OR COMPUTING DEVICES CONFIGURED FOR AUTOMATED DETECTION AND/OR READING OF OPTICAL CODES IN IMAGES OF VARYING QUALITY

(71) Applicant: Capital One Services, LLC, McLean, VA (US)

(72) Inventors: Jie Zou, McLean, VA (US); Wendi Lin, Rockville, MD (US); Fangyi Zou, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 345 days.

(21) Appl. No.: 17/591,969

(22) Filed: Feb. 3, 2022

(65) Prior Publication Data
US 2023/0244892 A1 Aug. 3, 2023

(51) Int. Cl.
*G06K 7/14* (2006.01)
*G06T 3/4046* (2024.01)
*G06T 3/60* (2006.01)
*G06T 5/73* (2024.01)
*G06T 7/10* (2017.01)

(52) U.S. Cl.
CPC .......... *G06K 7/1443* (2013.01); *G06T 3/4046* (2013.01); *G06T 3/60* (2013.01); *G06T 5/73* (2024.01); *G06T 7/10* (2017.01); *G06T 2207/20132* (2013.01)

(58) Field of Classification Search
CPC .... G06K 7/1443; G06K 7/146; G06T 3/4046; G06T 3/60; G06T 5/73; G06T 7/10; G06T 2207/20132
See application file for complete search history.

(56) References Cited

U.S. PATENT DOCUMENTS

| 6,575,367 B1 | 6/2003 | Longacre, Jr. |
| 9,558,386 B2 | 1/2017 | Yeakley |
| 2011/0102642 A1 | 5/2011 | Wang et al. |
| 2013/0021346 A1 | 1/2013 | Terman |

(Continued)

OTHER PUBLICATIONS

Song et al., "Decoding of PDF417 Barcode in Identity Authentication based on LabVIEW"; Telkomnika, vol. 11, No. 6, Jun. 2013, pp. 3005-3011.

(Continued)

*Primary Examiner* — Bobbak Safaipour
(74) *Attorney, Agent, or Firm* — Greenberg Traurig, LLP

(57) ABSTRACT

An example method includes receiving images that each include an optical code. The method further includes cropping the images to isolate the optical codes and rotating the images to achieve a desired orientation for the optical code of each of the images. The method further includes rectifying, after the cropping and the rotating, a perspective of each of the images to achieve a desired perspective angle for the optical code of each of the images. The method further includes deblurring, after the rectifying, the images to reduce blurring in each of the images. The method further includes binarizing, after the deblurring, the images to correct pixels of the optical code in each of the images. The method further includes performing, after the binarizing, an optical code reading process on the plurality of images to decode optical codes in the images.

20 Claims, 14 Drawing Sheets

(56) References Cited

U.S. PATENT DOCUMENTS

| | | |
|---|---|---|
| 2015/0363625 A1 | 12/2015 | Wu et al. |
| 2021/0174119 A1* | 6/2021 | Slattery ................ G06V 30/153 |
| 2024/0078706 A1* | 3/2024 | Lin ...................... G06V 10/245 |
| 2024/0203138 A1* | 6/2024 | Phalak .................. G06V 20/20 |

OTHER PUBLICATIONS

Lin et al., "Focal Loss for Dense Object Detection"; Facebook AI Research FAIR), ICCV, Computer Vision Foundation, pp. 2980-2988, Feb. 7, 2018.
Wu et al., "Recent Advances in Deep Learning for Object Detection"; Elsevier, Aug. 13, 2019.
Babu, "A 2019 guide to Human Pose Estimation with Deep Learning"; Nanonets, Automate Data Capture, 2021 Nano Net Technologies Inc.
Zhao et al., "Deep Dual Pyramid Network for Barcode Segmentation using Barcode-30k Database", Jul. 31, 2018.
Zharkov et al., "Universal Barcode Detector via Semantic Segmentation", ABBYY Production LLC, Jun. 17, 2019.
Xiao et al., "1D Barcode Detection via Integrated Deep-Learning and Geometric Approach", MDPI, Applied Sciences, 2019, 9, 3268.
Hansen et al., "Real-Time Barcode Detection and Classification using Deep Learning"; Proceedings of the 9th International Joint Conference on Computational Intelligence (IJCCI 2017) pp. 321-327.
Zhou et al., "Objects as Points"; CenterNet: Object detection, 3D detection, and pose estimation using center point detection; <<https://github.com/xingyizhou/CenterNet>> retrieved Nov. 3, 2021.
International Search Report and Written Opinion from International Appln. No. PCT/US23/61676 dated Apr. 26, 2023.

\* cited by examiner

COMPUTER-BASED SYSTEMS AND/OR COMPUTING DEVICES CONFIGURED FOR AUTOMATED DETECTION AND/OR READING OF OPTICAL CODES IN IMAGES OF VARYING QUALITY

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of automated detection and/or reading of optical codes in images of varying quality, such as finding and decoding barcodes included in images uploaded using different cameras, lighting, angles, etc.

BACKGROUND OF TECHNOLOGY

A computer network platform/system may include a group of computers (e.g., client devices (e.g., laptops, desktop computers, tablets, smartphone devices, internet of things (IOT) devices, etc.), servers, wireless routers or other networking devices) and other computing hardware devices that are linked together through one or more communication channels to facilitate communication and/or resource-sharing, including for automated detection and/or reading of optical codes in images of varying quality. For example, different computing devices with different camera capabilities may be used to capture and upload images. Computing devices may also be used to read encoded optical images captured as part those images.

SUMMARY OF DESCRIBED SUBJECT MATTER

In some embodiments, the present disclosure provides an exemplary technically improved computer-based method that includes at least receiving, by a processor of a computing device, a plurality of images. Each of the plurality of images includes an optical code. The method further includes performing, by the processor, a first optical code reading process on the plurality of images to decode optical codes of a first subset of the plurality of images. The method further includes cropping, by the processor, a second subset of the plurality of images that were not decoded during the first optical code reading process to isolate optical codes of the second subset of the plurality of images. The method further includes rotating, by the processor, the second subset of the plurality of images to achieve a desired orientation for each of the optical codes of the second subset of the plurality of images. The method further includes rectifying, by the processor, after the cropping and the rotating, a perspective of each of the second subset of the plurality of images to achieve a desired perspective angle for each of the optical codes of the second subset of the plurality of images. The method further includes performing, by the processor, after the rectifying, a second optical code reading process on the second subset of the plurality of images to decode optical codes of a third subset of the plurality of images. The method further includes deblurring, by the processor, after the second optical code reading process, a fourth subset of the plurality of images that were not decoded during the first optical code reading process or the second optical code reading process to reduce blurring in each of the fourth subset of the plurality of images. The method further includes performing, by the processor after the deblurring, a third optical code reading process on the fourth subset of the plurality of images to decode optical codes of a fifth subset of the plurality of images. The method further includes binarizing, by the processor, after the third optical code reading process, a sixth subset of the plurality of images that were not decoded during the first optical code reading process, the second optical code reading process, or the third optical code reading process to correct pixels of optical codes of the sixth subset of the plurality of images. The method further includes performing, by the processor after the binarizing, a fourth optical code reading process on the sixth subset of the plurality of images to decode optical codes of a seventh subset of the plurality of images.

In some embodiments, the present disclosure provides an exemplary technically improved computer-based system that includes at least the following components of a memory and at least one processor coupled to the memory. The processor is configured to receive a plurality of images. Each of the plurality of images includes an optical code. The processor is further configured to perform a first optical code reading process on the plurality of images to decode optical codes of a first subset of the plurality of images. The processor is further configured to crop a second subset of the plurality of images that were not decoded during the first optical code reading process. The processor is further configured to rotate the second subset of the plurality of images to achieve a desired orientation for each of the optical codes of the second subset of the plurality of images. The processor is further configured to rectify a perspective of each of the second subset of the plurality of images. The processor is further configured to perform a second optical code reading process on the second subset of the plurality of images to decode optical codes of a third subset of the plurality of images. The processor is further configured to deblur a fourth subset of the plurality of images that were not decoded during the first optical code reading process or the second optical code reading process. The processor is further configured to perform a third optical code reading process on the fourth subset of the plurality of images to decode optical codes of a fifth subset of the plurality of images. The processor is further configured to binarize a sixth subset of the plurality of images that were not decoded during the first optical code reading process, the second optical code reading process, or the third optical code reading process to correct pixels of each of optical codes of the sixth subset of the plurality of images. The processor is further configured to perform a fourth optical code reading process on the sixth subset of the plurality of images to detected optical codes of a seventh subset of the plurality of images.

In some embodiments, the present disclosure provides an exemplary technically improved non-transitory computer readable medium having instructions stored thereon that, upon execution by a computing device, cause the computing device to perform operations including receiving a plurality of images. Each of the plurality of images comprises an optical code. The instructions further cause the computing device to perform operations including cropping the plurality of images to isolate the optical code of each of the plurality of images. The instructions further cause the computing device to perform operations including rotating the plurality of images to achieve a desired orientation for the optical code of each of the plurality of images. The instructions further cause the computing device to perform operations including rectifying, after the cropping and the rotating, a perspective of each of the plurality of images to achieve a desired perspective angle for the optical code of each of the plurality of images. The instructions further cause the computing device to perform operations including deblurring, after the rectifying, the plurality of images to reduce blurring in each of the plurality of images. The instructions further cause the computing device to perform operations including binarizing, after the deblurring, the plurality of images to correct pixels of the optical code in each of the plurality of images. The instructions further cause the computing device to perform operations including performing, after the binarizing, an optical code reading process on the plurality of images to decode optical codes in the plurality of images.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
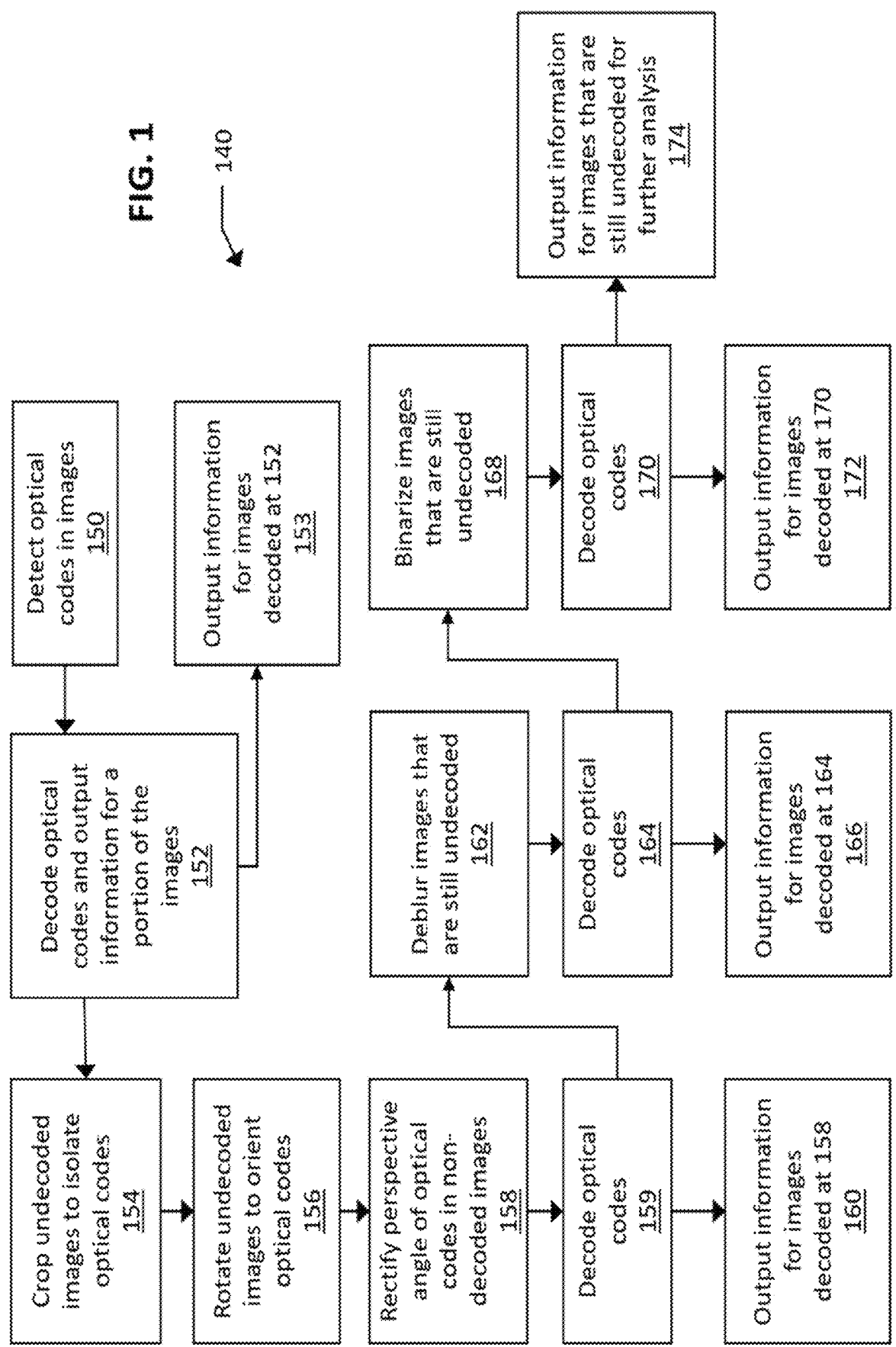
FIG. 1 is a diagram illustrating a method for automated detection and/or reading of optical codes in images of varying quality in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

Described herein are methods, systems, computer readable media, etc. for detecting and decoding optical codes in images that may be of varying quality, orientation, placement within an image, type of code, etc. For example, in various embodiments, optical codes that are desirable to decode, such as a portable data file 417 (PDF417) standard barcode on the back of a driver's license or other identification card, may be included in images captured by a consumer and uploaded to a server via a web site or mobile application (e.g., app), sent as an attached or embedded photo to an email, and/or captured using a fax machine, scanner, and/or photocopier. PDF417 is a type of stacked linear barcode, and therefore other types of stacked linear barcodes may also be detected and read as described herein. Thus, in addition to different types of images that may be received by a server or other computing device, the placement of the optical codes and/or identification document within such images may vary due to different consumers capturing the images using different devices. As such, there may be difficulties in attempting to decode the optical codes within various types of images due to the variability of such codes. The methods, systems, computer readable media, etc. described herein may therefore be used to improve the number of optical codes that may be successfully decoded within disparate images using various automated processes implementing on computing devices.

Various embodiments described herein therefore include specific process flows for identifying optical codes such as barcodes within images uploaded by customers, processing the image to enhance image quality, and successfully scanning the barcodes in the image that otherwise may not be scannable. Various embodiments described herein also include technical aspects that provide for improvement to the functioning of computing devices and provide for more efficient use of computing resources. First, the embodiments herein improve the functioning of computing devices at least because the embodiments described herein enable computing devices to decode more optical codes than methods implemented by prior computing devices. In other words, because some images including optical codes may be obscured or otherwise difficult to decode as described herein, computing devices using prior methods may not be able to properly decode optical codes in such images. As such, by using the embodiments described herein may enable computing device function to be improved by enabling the computing devices to successfully decode more optical codes than the computing device may otherwise be able to decode.

Second, the embodiments herein may provide for more efficient use of computing resources. The various embodiments described herein include different types of processing of images, such as cropping of images, rotating of images, deblurring of images, rectifying perspective of images, and binarizing images to correct the images. As described further herein, various optical codes of varying image quality may be decoded using some or all of the processing steps described herein. However, some of those processing steps may use more computing resources, such as processing power and/or memory for executing processes, to complete on a set of given images than other processes. Accordingly, computing devices may operate more efficiently if processes that use comparatively less computing resources are performed earlier, and one or more interim attempts to decode optical codes are performed after the steps that may use less processing power. For example, an optical code in an image may be recognized by an automatic optical code reading process after only cropping, rotating, and rectifying the image as described herein. If so, the information extracted from that optical code may be transmitted, stored, or otherwise processed without having to perform additional processing steps, such as deblurring or binarization. The deblurring, for example, may be more resource intensive than the cropping, rotating, and/or rectifying steps. As such, at least for some images, the more resource intensive processing steps may be avoided while only performing more resource intensive processing steps on images that otherwise may not be readable. As such, the total number of images on which some of the processing steps are performed may be reduced as compared to embodiments where all processing steps are performed on all images. As another example, in various embodiments, a binarization step on an image may be performed multiple times with different parameters to attempt to find binarization parameters that work to make an image readable. Performing multiple iterative binarizations with different parameters and attempting to read an optical code in an image after each binarization may also be more resource intensive than the cropping, rotating, and/or rectifying steps, for example. Accordingly, for embodiments where iterative binarization may be performed, it may be useful to read as many codes as possible based on the cropping, rotating, and/or rectifying steps.

In addition, various embodiments described herein may include an order of its processing operations that improve the functioning of computing devices. For example, the success in decoding optical codes after performing certain processing functions may be improved if other image processing was already complete prior to a given image processing step. For example, a binarizing step for processing images may result in more images being successfully decoded from a given image set if a deblurring processing step is completed prior to the binarizing step. In various other embodiments, other processing steps described herein may be performed in various orders to increase the percentage of optical codes in a given image set that are successfully decoded. The various embodiments described herein having certain orders of processing steps that may increase the total number of optical codes in an image set that may be successfully decoded therefore represent a technological improvement to computing devices. In other words, the embodiments described herein provide for various orders of operation in processing images that results in computing devices more successfully decoding optical codes, thereby improving the functioning of those computing devices. Such embodiments also cause the computing devices to operate more efficiently, because no additional computing power may be used to further process optical images that have been successfully decoded.

The various embodiments described herein therefore provide improved technical solutions for various technical problems that occur in previous methods for decoding optical codes in images, and particularly in images having varying quality, orientation, size, etc. (e.g., images uploaded by different users with different computing devices). In particular, specific image processing techniques and/or orders of implementing those techniques represent technical solutions to the problem of identifying and decoding optical codes within different and sometimes low-quality image types. Thus, the technical aspects of using computing devices to perform the specific image processing embodiments described herein provides significant technical advantages over systems that may not use the embodiments described herein.

As such, the methods, systems, and computer readable media described herein represent demonstrable technological improvements over prior systems for processing images in order to decode optical codes. In other words, the embodiments herein provide for a particular manner of processing images that result in the technical benefits described herein as opposed to conventional or known methods for processing images with optical codes.

In a specific example, a company that maintains confidential information of its users may be required to verify the identification of its users. As such, the company may have a large database of images uploaded from users that include various identification forms (e.g., driver's licenses, passports, etc.). Automated scanning of those images for customer information may be error prone, particularly as the quality of images taken by users may vary widely (e.g., focus, lighting, angle, etc. may all vary). In order to address this problem, various scannable barcodes such as a barcode standard called PDF417 have been developed. However, in various instances, users may still upload images that may make the barcodes difficult to read. As such, described herein are processes for cropping, rotating, fixing perspective/angle issues, deblurring, and binarizing images to increase the success rate of accurately scanning barcodes such as PDF417 barcodes embedded in images uploaded by users. The embodiments herein may also perform barcode reading/decoding at various points in the process to read images that may need less processing to correct and read the barcodes. This may reduce the amount of images that will be subject to all of the pre-processing steps, such as deblurring and/or multiple iterations of binarization steps that may use comparatively more processing/computing power.

In various embodiments, different aspects are described with respect to FIGS. 16-19 that are described in further detail below. Any combination of the various computing components and aspects of FIGS. 16-19 may be used in the various embodiments described herein. For example, users may use any of client devices 102, 103, 104, or 202a through 202n to capture and transmit/upload as described herein. The client devices 102, 103, 104, or 202a through 202n may communicate with server devices 106, 107, 204, or 213; network databases 207 or 215; and/or one or more cloud components 225 through the networks 105 or 206 (e.g., by users' uploading images to one or more servers, where the images include at least one optical code). Any of the server devices 106, 107, 204, or 213; the network databases 207 or 215; and/or the one or more cloud components 225 may execute or implement the embodiments as described herein to identify optical codes in images, process the images, and successfully decode optical codes in the images. In various embodiments, the client devices 102, 103, 104, or 202a through 202n may additionally or alternatively be used to implement or execute the methods or processes described herein. In any event, one or more of the computing devices, systems, etc. may be in communication with any or all of the other devices shown in FIGS. 16-19 to implement the systems and methods described herein. In addition, once an optical code is successfully decoded by one or more of the computing devices in FIGS. 16-19, the information extracted from that optical code may be saved in a memory and/or transmitted to any of the devices shown in FIGS. 16-19 for further processing, storage, transmission to another device, etc. For example, images may be received from the client devices 102, 103, 104, or 202a through 202n at the server devices 106, 107, 204, or 213; the network databases 207 or 215; and/or the cloud components 225, and server devices 106, 107, 204, or 213; the network databases 207 or 215; and/or the cloud components 225 may process the images and/or decode the optical codes as described herein. The components shown in FIGS. 16-19 are described in greater detail below after the discussions of FIGS. 1-15.

Figure 4:
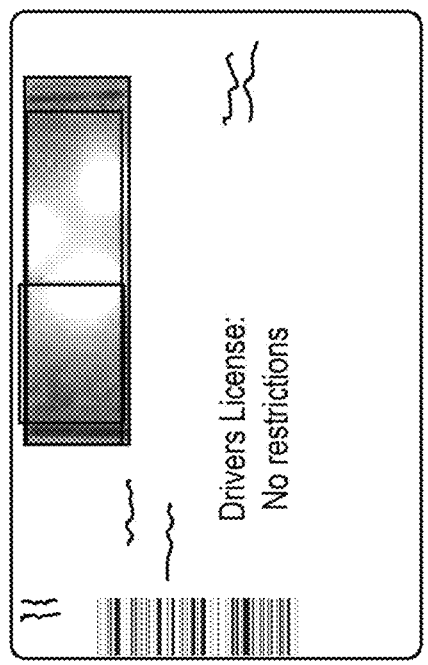
FIG. 4 is an example image having an optical code where the image is blurred, has glare, and has a skewed perspective in accordance with one or more embodiments of the present disclosure.

FIG. 1 is a diagram 100 illustrating a method for automated detection and/or reading of optical codes in images of varying quality in accordance with one or more embodiments of the present disclosure. In particular, at an operation 150, optical codes in various images may be detected. Examples of such optical codes are shown in FIGS. 4-14 for reference. For example, FIG. 4 shows an identification card 420 with an optical code in a bounding box 422. The bounding box 422 may be used to visually indicate where a candidate that an automated detection for detecting optical codes process has identified a possible optical code. As also shown in FIG. 4, the identification card 420 may have aspects that make the optical code difficult to read, such as glare from lighting at points 424. The identification card 420 is also skewed (e.g., has perspective distortion), such that rectification of perspective of the image may assist in decoding the optical code. The identification card 420 may also be somewhat blurry or out of focus.

Figure 5:
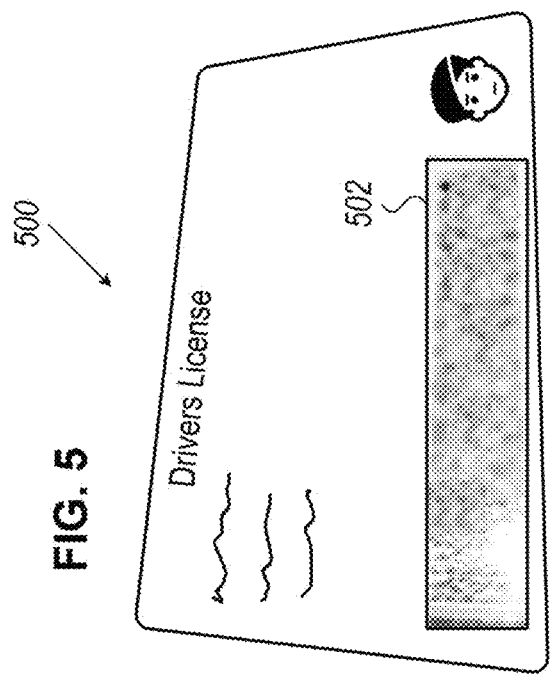
FIG. 5 is another example image having an optical code where the image is blurred, has glare, and has a skewed perspective in accordance with one or more embodiments of the present disclosure.
Figure 6:
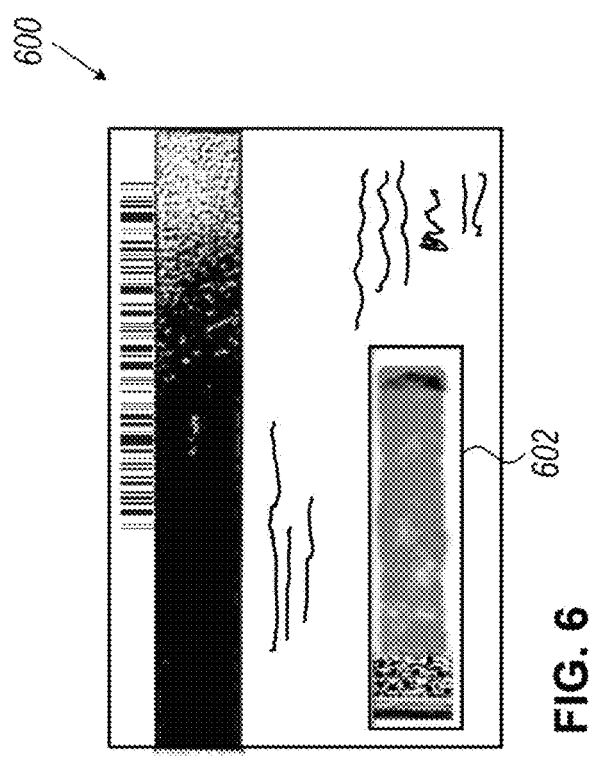
FIG. 6 is an example image having an optical code that has been scanned or faxed in accordance with one or more embodiments of the present disclosure.

FIG. 5 shows another example of an identification card 500 with a bounding box 502 identifying an optical code. The identification card 500 is also blurry, has glare, and has a skewed perspective like the identification card 420 in FIG. 4. FIG. 6 shows an identification card 600 in an image that may be a scan, fax, or copy of the identification card 600, therefore making it lower in quality than an image captured by a camera, for example. Even if a user does use a high quality camera, lighting quality, view angle, image focus etc. can all vary. In some instances, users may even take or upload a photo of a screen (e.g., an inelegant screen shot) that is displaying an identification document. The embodiments herein may detect optical codes within and read/decode those optical codes of any such types of images. The identification card 600 includes a bounding box 602 identifying an optical code. The optical codes in FIGS. 4-6 each represent a PDF417 type optical code. However, the various embodiments herein may be applied to any kind of optical code that encodes information in some kind of visual code, such as other types of bar codes, QR codes, etc. In various embodiments, the image processing steps described herein may also be used on images for performing other kinds of image detection and processing, such as optical character recognition and/or facial recognition. In other words, the embodiments described herein are not limited as to the type of information that may be decoded from an image, but rather provide processing that may make any type of information decoding or processing from a group of disparate images easier and/or more efficient to perform.

Figure 7:
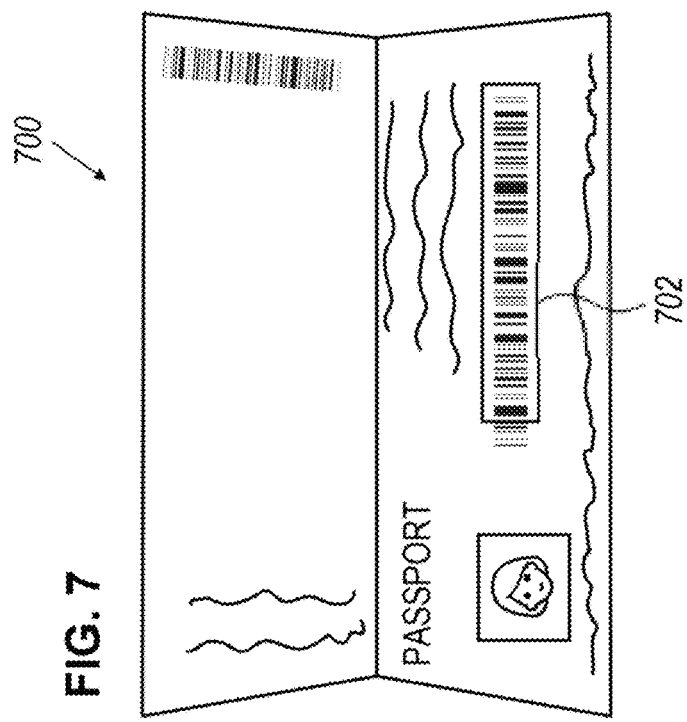
FIG. 7 is an example image having an optical code that is part of a passport identification document in accordance with one or more embodiments of the present disclosure.
Figure 8:
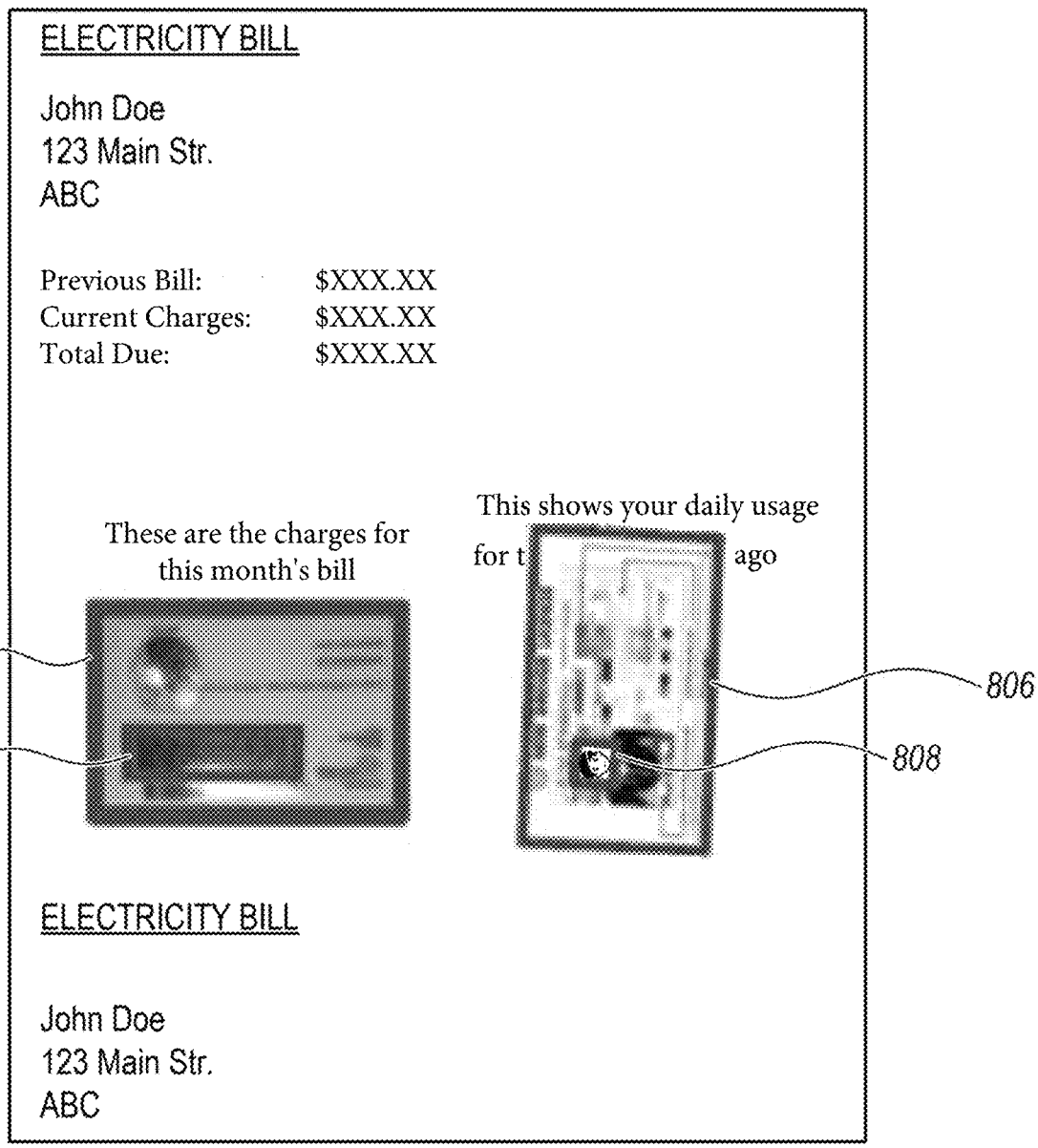
FIG. 8 is an example image having an optical code that is part of an identification document embedded in another document in accordance with one or more embodiments of the present disclosure.

FIG. 7 shows an example of a passport identification 700 with a bounding box 702 detecting an optical code. FIG. 8 shows an example of an identification document that is embedded within another document 800. In particular, the document 800 of FIG. 8 shows a utility bill, for example, which includes images of an identification card thereon. The detection of optical codes in images (e.g., at the operation 150 of FIG. 1) may recognize both optical codes, other visual information, and/or identification documents within an image. In the example of FIG. 8, the detection process recognizes two sides of the identification card as shown by bounding boxes 804 and 806, as well as an optical code indicated at bounding box 802 and a face of an individual indicated at bounding box 808. As described herein, the embodiments herein may be used for recognizing more than just information encoded in barcodes.

In various embodiments, an automated detection algorithm or machine learning model may be used to detect the optical codes or other desired aspects of a group of images. For example, a machine learning model or algorithm may be trained to recognize desired aspect(s) of images by inputting images with known locations of desired aspect(s) into the model. Once trained on this data, the machine learning model or algorithm may be able to successfully recognize aspects such as the PDF417 barcodes shown in various examples in the figures herein. For example, an algorithm referred to as RetinaNet, a deep learning based object detection algorithm, may be used in various embodiments to detect aspect(s) of images as desired for further processing. RetinaNet is described further in Focal Loss for Dense Object Detection by Lin et al., 2017 IEEE International Converence on Computer Vision (ICCV) (2017), the entire contents of which is incorporated by reference herein. Such an algorithm may be trained as described herein to detect desired aspect(s) of an image, such as PDF417 barcodes or any other optical or visual component of an image.

In addition, a machine learning model or algorithm may also be trained to recognize the corner points of a desired aspect of an image, such as the four corners of a barcode. Such information may be useful for the various processing steps described herein, such as perspective rectification. In such embodiments, an additional processing step to identify the four corners of a desired visual aspect(s) of an image may not need to be performed if it is already done as part of the optical code (or other aspect) detection at operation 150. For example, an algorithm referred to as CenterNet may be used to find a center point of a desired object in an image, and estimate the height and width of that image to determine its four corner points at the same time as the object is detected. An example of the CenterNet machine learning model or algorithm is described further at https://github.com/xingyizhou/CenterNet, which is incorporated by reference herein in its entirety. In various embodiments, the four corners of an optical code may be identified by a quadrilateral (e.g., a bounding box) and/or manually by a user.

At an operation 152, a first optical code reading process may be performed on the plurality of images to decode optical codes of a subset of the plurality of images that have not yet been decoded. In other words, for the images for which an object was detected at operation 150, an optical code reading process may be run on those images to see if any of the optical codes may be decoded without further processing. In various embodiments, the operation 152 may also be omitted, and all images for which an object is detected may be advanced for further processing prior to attempting to decode the optical codes. Where optical codes are decoded, the images for which optical codes were not detected may be advanced for further processing while those images for which optical codes were detected may be remove from the process (e.g., since the information desired was already decoded from the images). At operation 152, information from any decoded images may also be transmitted to another computing device for storage, other processing, etc. as desired at an operation 153.

Various optical readers/scanners may be used in the various embodiments described herein. For example, a zebra crossing (ZXing) barcode scanning decoder may be used to read/decode a black and white pattern printed on an identification card, for example. ZXing is a software library for reading barcodes on images. Prior scanners, such as laser scanners, may detect a pattern or code by determining the amount of light (e.g., which regions are white vs. black) reflected when scanning to read a code. However, such scanners may not be able to decode images as described herein. In other words, prior scanners like laser scanners may not be able to accurately decode or read images that the embodiments described herein are able to decode/read. As such, the embodiments herein may advantageously read/decode optical codes to translate their black and white patterns into a set of alphanumeric values (e.g., data such as identification number, name, date of birth, address, issue and/or expiry date, etc.).

Figure 9:
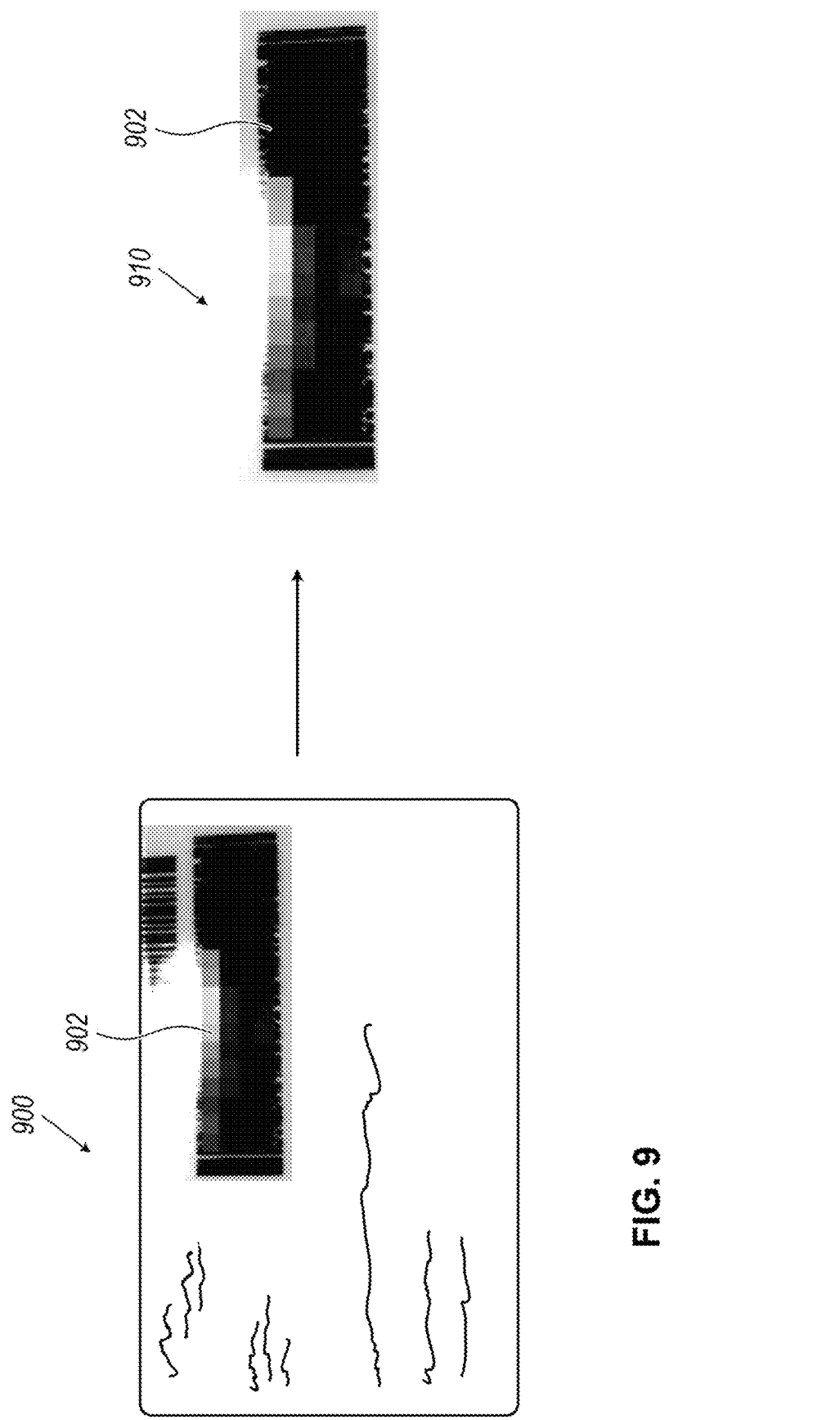
FIG. 9 shows example images demonstrating the cropping of an image based on an optical code detected therein in accordance with one or more embodiments of the present disclosure.

At an operation 154, a subset of the plurality of images that were not decoded during the first optical code reading process (e.g., at operation 152) are cropped to isolate optical codes of the plurality of images. In other words, an object of interest in an image may be isolated through cropping. An example of which is shown in FIG. 9, where an identification card 900 has an optical code 902. That optical code 902 is isolated in cropped image 910, so that extraneous information is removed from the original image. Cropping may also be performed on, for example, the example images in FIGS. 4-8. As described herein, an optical code detection process may place a bounding box over or around an optical code. Such a bounding box may be used as the bounds to which an image may be cropped, for example. In another example, the cropping may occur around identified corners of an optical code. In various embodiments, the system may perform another optical code reading process to try to decode information from the images after cropping. If optical codes are successfully decoded, that information may be output and transmitted to another computing device(s), and those images may be removed from processing to improve computing efficiency and functioning as described herein.

Figure 10:
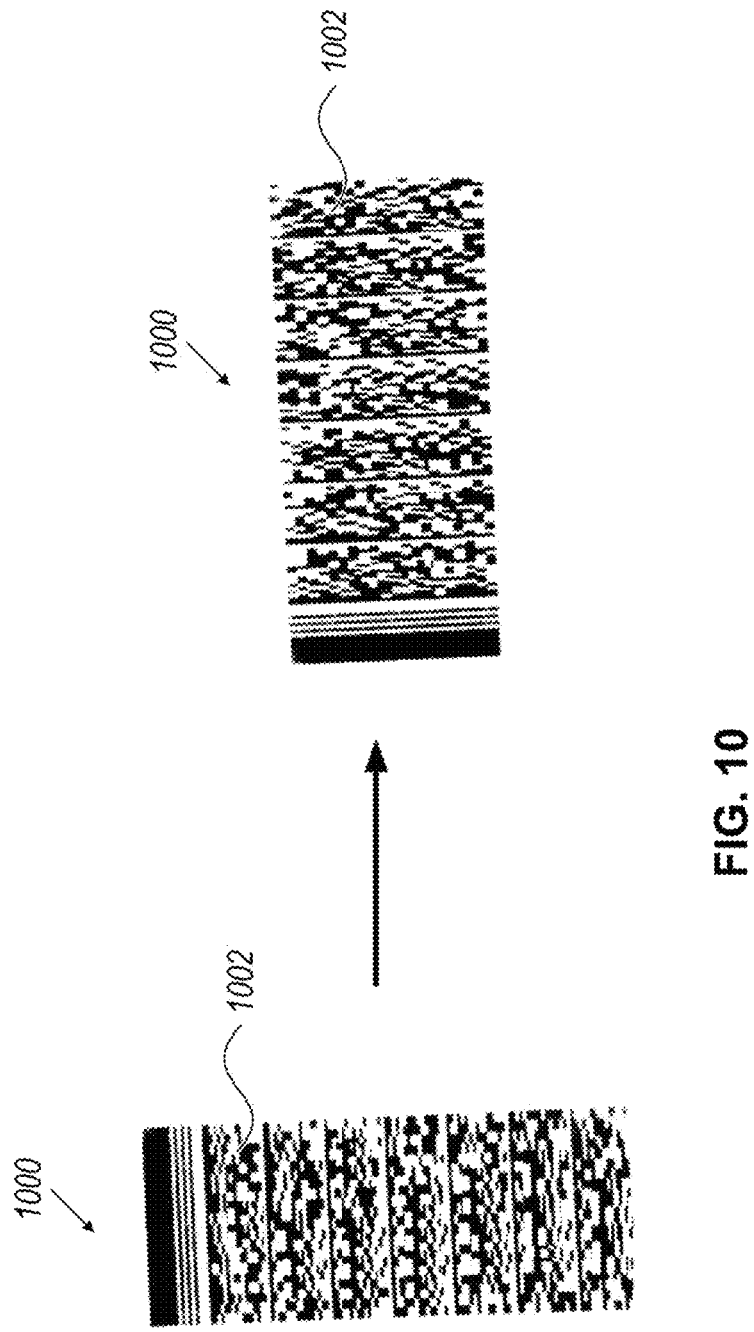
FIG. 10 shows example images demonstrating the rotating of an image based on an optical code detected therein in accordance with one or more embodiments of the present disclosure.

At an operation 156, a subset of the plurality of images that have not yet been decoded may be rotated to achieve a desired orientation for each of the optical codes of the plurality of images. An example of a rotated image is shown in FIG. 10, where an optical code 1002 of image 1000 is rotated as shown in image 1010. In particular in FIG. 10, a vertically oriented barcode is rotated 90 degrees so that all images have a horizontal orientation, which may be easier for certain optical code readers to read. In addition, rotation at the operation 156 may aid in accurately performing perspective rectification at operation 158 discussed below. In various embodiments, the system may perform another optical code reading process to try to decode information from the images after rotating. If optical codes are successfully decoded, that information may be output and transmitted to another computing device(s), and those images may be removed from processing to improve computing efficiency and functioning as described herein.

At an operation 158, after the cropping and the rotating a perspective of each of a subset of the plurality of images that have not yet been decoded may be rectified to achieve a desired perspective angle for each of the optical codes of the second subset of the plurality of images. Perspective may be rectified by, for example, a process 300 shown in FIG. 3 for rectifying an image. Determining an aspect ratio of the object in the image at an operation 302 (e.g., of the optical code), locating the corner points at an operation 304 (which may be done as part of code detection at operation 150 or may be done at the operation 158 separately), finding a matrix that matches the original points to points with a correct or expected aspect ratio for a particular type of optical code expected at an operation 306, and applying the matrix to all the points in the image to yield a rectified image at an operation 308. This rectification may occur after the cropping and rotating at operations 154 and 156, for example. In other words, at FIG. 3 and/or operation 158, the rectification of perspective of an image may include locating corner points of each of optical code and using the corner points to correct an aspect ratio of the second subset of the plurality of images.

Figure 11:
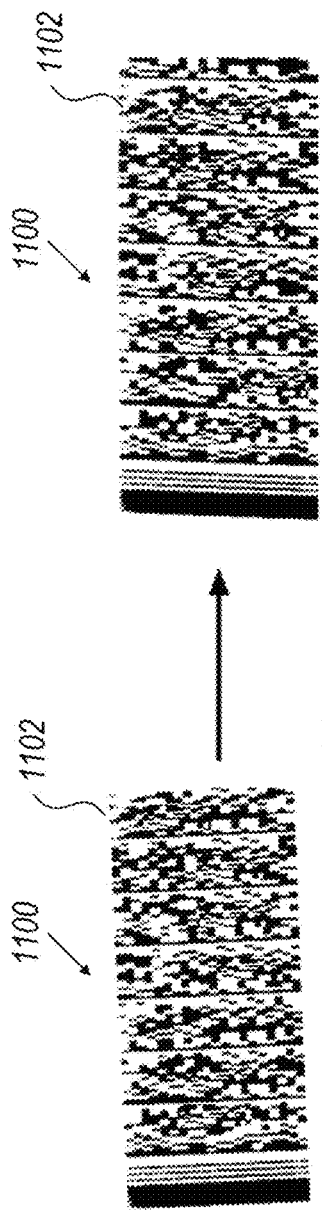
FIG. 11 shows example images demonstrating the rectifying of perspective of an image based on an optical code detected therein in accordance with one or more embodiments of the present disclosure.

In other embodiments, the order of operations of FIG. 1 may be varied and/or may omit certain operations. An example of a correction of perspective distortion is shown in FIG. 11. In particular, the perspective of the optical code 1102 in image 1100 is rotated and corrected in image 1110 so that edges of the optical code itself are generally parallel with respect to edges of the images. Note that correcting perspective may also result in some additional cropping of the image so that the optical code is more readable to an automatic optical code reading process.

At an operation 159, an optical code reading process may be performed on a subset of the plurality of images that have not yet been decoded in order to decode optical codes of the plurality of images. The operation 159 may occur after the rectification is complete at the operation 158, or may occur at different times in various embodiments. At an operation 160, information decoded form the images may be output or transmitted to other computing devices.

Figure 12:
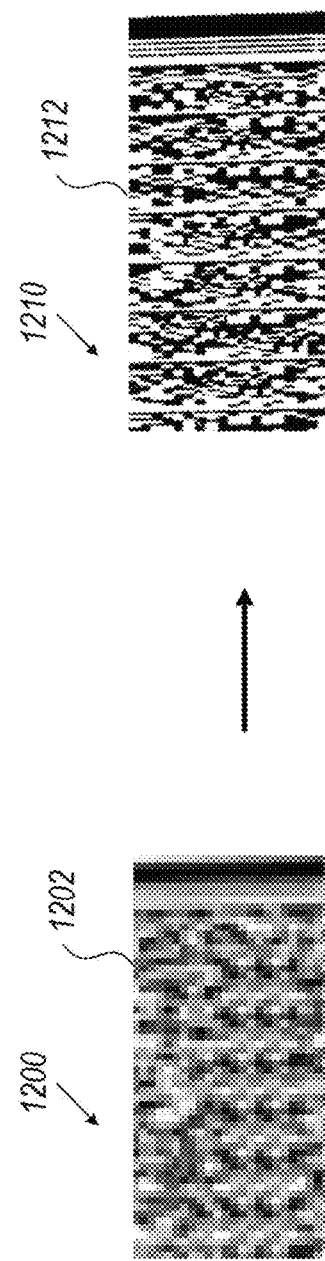
FIG. 12 shows example images of optical codes that are blurry in accordance with one or more embodiments of the present disclosure.

At an operation 162, a subset of the plurality of images that are not yet decoded (e.g., during the code detection processes at operations 152 and/or 159—and/or any other optical code reading process that has occurred) are deblurred to reduce blurring in each the plurality of images not yet decoded. Examples of blurry images that may be deblurred are shown in FIG. 12, which shows a first blurry optical code 1202 in image 1200 and a second blurry optical code 1212 in the image 1210. Various types of deblurring may be implemented in the embodiments described herein. For example, a scale-iterative upscaling neural-network (STUN) process for image deblurring may be used, a machine learning/deep learning (ML/DL) algorithm may be trained and used for deblurring, and/or a method referred to as DeblurGAN (version 1 or 2) may be used.

Where an STUN deblurring technique is used, the process may include both iterative aspects and upscaling. SIUN may therefore, for example, include a recurrent neural network (RNN) that includes directed graph-like connections between nodes so that the RNN may exhibit temporal dynamic behavior, and may be more efficient in dealing with images of various scenarios such as text, codes, and/or faces. The upscaling aspect of SIUN includes an upscaling network that adapts superresolution structure instead of an upsampling layer, for example, so that features of a downsampled deblurring image may be preserved while upscaling between iterations to restore more detailed images. Such features may yield a well deblurred image, including ones that may be more easily binarized as discussed below. When using a model such as SIUN, the model may be used trained or untrained. Advantageously, the SIUN may be used untrained in instances where a data set of clear and blurred images of the same objects does not exist (e.g., when a customer has only uploaded a blurry image). As such, models that deblur without needing to be trained may be especially useful for the various implementations described herein. If the model is meant to deblur and/or recognize text, faces, or other more common aspects of images, the model may be trained using more generic data. In various embodiments, the model may be trained using generic optical codes so that the model may deblur other optical codes. The deblurring may occur, for example, after the optical code reading process at the operation 159. In various embodiments, the deblurring may also occur at different points in FIG. 1.

At an operation 164, an optical code reading process may be performed on a subset of the plurality of images that have not yet been decoded in order to decode optical codes of the plurality of images. The operation 164 may occur after the deblurring is complete at the operation 162, or may occur at different times in various embodiments. At an operation 166, information decoded form the images may be output or transmitted to other computing devices.

At an operation 168, a subset of the plurality of images that have not yet been decoded are binarized to correct pixels of optical codes of the plurality of images that are not yet decoded. The binarization may occur after the optical code reading process at the operation 164 and/or the deblurring at the operation 162. In various embodiments, the binarization may also occur at different points in FIG. 1. The binarization of the images may be particularly useful to perform on the images after one or more of the prior operations of FIG. 1 are performed. For example, performing multiple iterations of binarization with different parameters until a code is readable may be computing resource intensive, so it may be beneficial to, for example, crop the images before binarizing them. As another example, the binarization process may be more accurate if the images are deblurred and cropped before binarizing, so that pixels are clearer and the binarizing is concentrated on portions of the image that are of interest. In various embodiments, a histogram equalization process may be performed at any point of the process in FIG. 1 as well. Histogram equalization may include using an images histogram to balance different portions of an image with respect to the contrast of an image.

Figure 13:
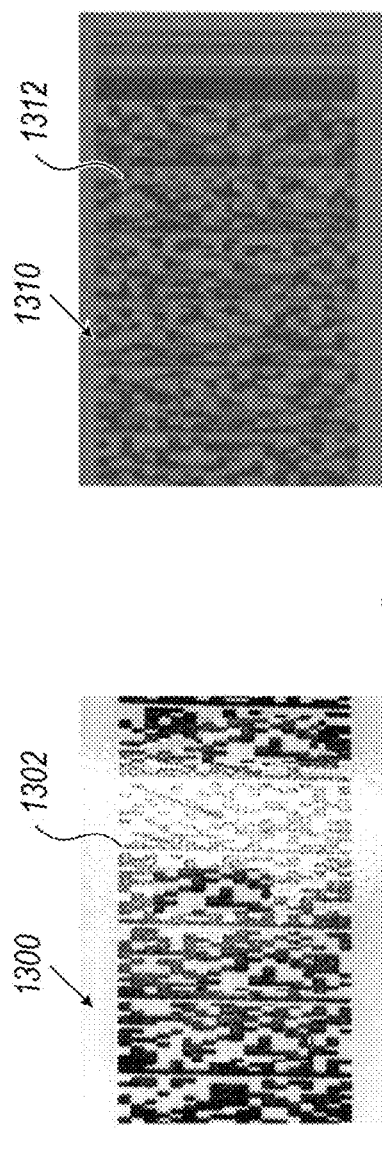
FIG. 13 shows examples of images that have a reflection of light or are dim with respect to an optical code therein in accordance with one or more embodiments of the present disclosure.

FIG. 13 shows examples of images that may be useful to binarize. For example, optical code 1302 of image 1300 has a portion that is washed out due to glare from a lighting source, which may make the optical code 1302 difficult to read. Optical code 1312 of an image 1310 may have been take with too dim of lighting, so that features of the optical code 1312 may not be readable.

Figure 14:
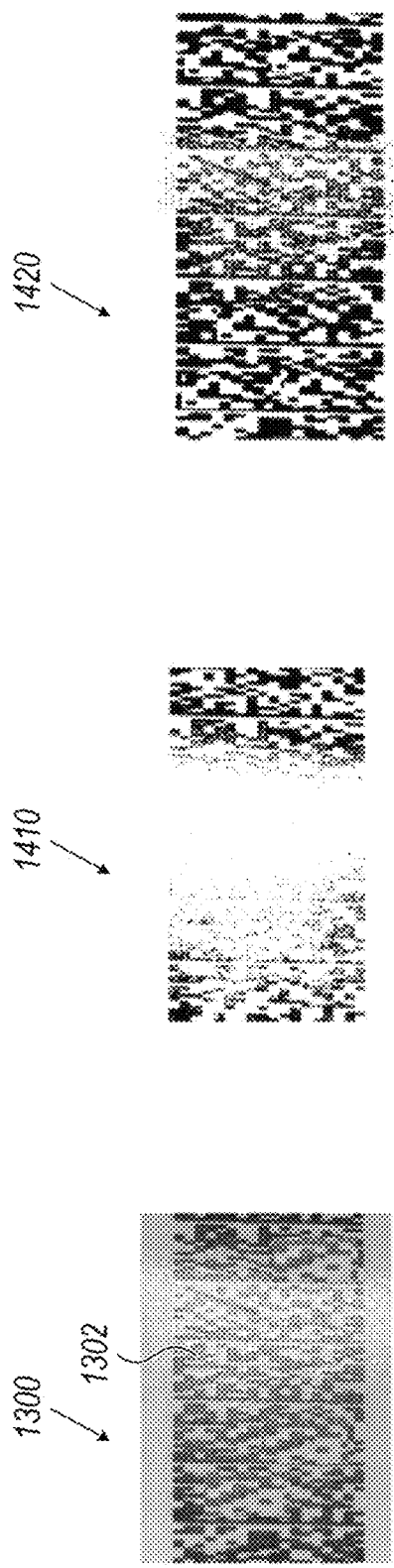
FIG. 14 shows example images demonstrating the binarization of an image in accordance with one or more embodiments of the present disclosure.

FIG. 14 shows the image 1300 with the optical code 1302 of FIG. 13, and how that image may be binarized to make it more readable to an optical code reader. Image 1410 shows the results of a simple threshold binarization, where for every pixel of the image, the same threshold value is applied. If the pixel value is smaller than the threshold, the pixel value is set to 0 (e.g., white), otherwise it is set to a maximum value (e.g., black). Image 1420 shows a binarized version of the optical code 1302 using adaptive threshold binarization. In such an embodiment, a binarization algorithm determines the threshold to apply to a given pixel (e.g., whether to characterize the pixel as a black or white value) based on the relative darkness or brightness of the pixels in a small region around the given pixel. In particular, the pixels in the portion of the optical code 1302 washed out by reflected light may be considered with respect to the other pixels nearby to determine whether they should be characterized as 0 or the maximum value (e.g., white or black). As such, the pixels that are more visible in the image 1300 are therefore not considered in correcting the most washed out portions of the image 1300. As shown, for the optical code 1302, the adaptive threshold binarization was more successful in reproducing the optical code.

At an operation 170, an optical code reading process may be performed on a subset of the plurality of images that have not yet been decoded in order to decode optical codes of the plurality of images. The operation 170 may occur after the binarization is complete at the operation 168, or may occur at different times in various embodiments. At an operation 172, information decoded form the images may be output or transmitted to other computing devices. At an operation 174, images that have not yet been decoded and any accompanying information (e.g., one or more of the images as processed at various points in the process of FIG. 1, the original images) may be output to a computing device for further processing, such as manual review and/or follow up with a user to which the document is related.

Figure 2:
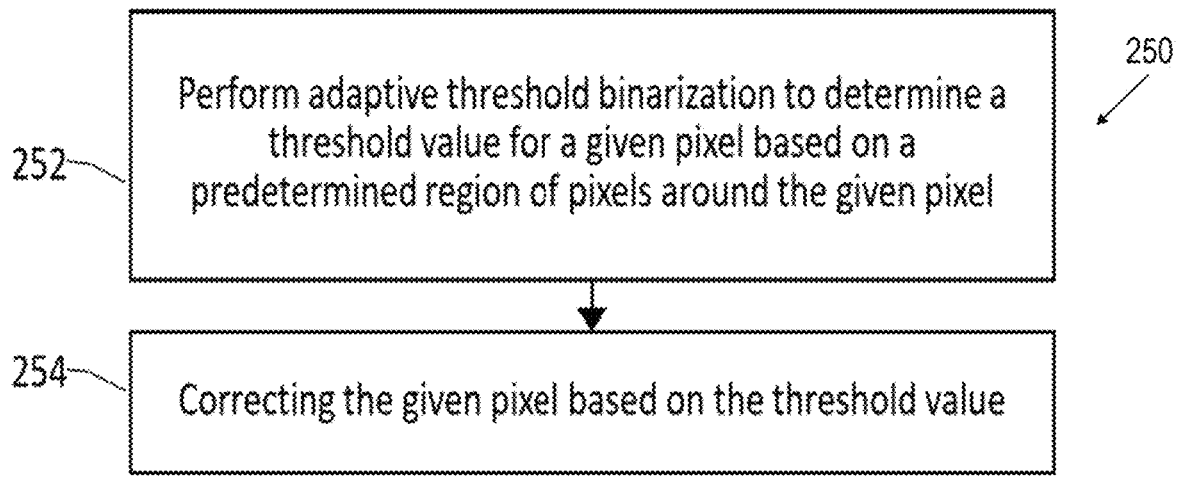
FIG. 2 is a flowchart illustrating a process for binarizing images as part of an automated detection and/or reading of optical code process in images of varying quality in accordance with one or more embodiments of the present disclosure.
Figure 3:
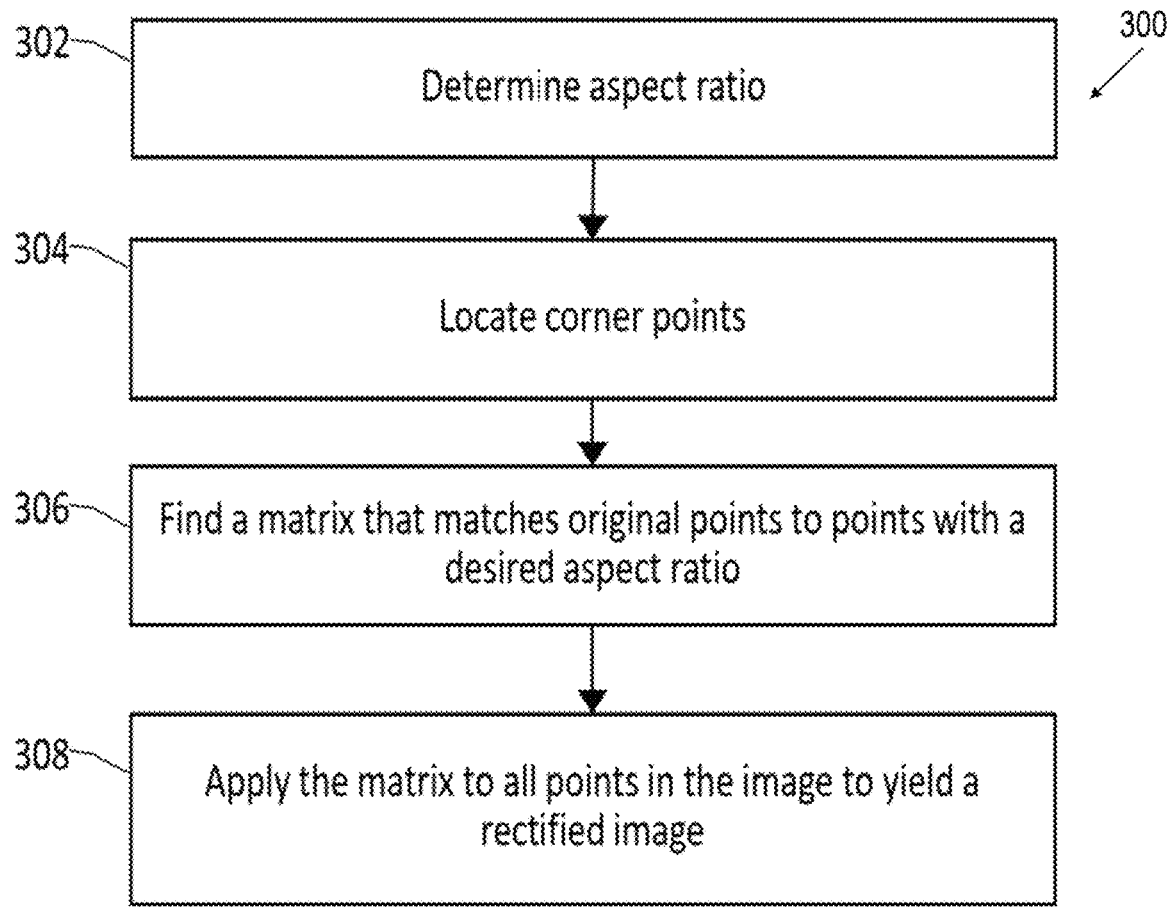
FIG. 3 is a flowchart illustrating a process for rectifying perspective of an image in accordance with one or more embodiments of the present disclosure.

FIG. 2 is a flowchart illustrating a process 200 for binarizing images as part of an automated detection and/or reading of optical code process in images of varying quality in accordance with one or more embodiments of the present disclosure. For example, the process 200 may be used at the operation 168 of FIG. 1. At an operation 252, an adaptive threshold binarization may be performed to determine a threshold value for a given pixel based on a predetermined region of pixels around the given pixel. The predetermined region may be a pixel area size around, a number of pixels from the given pixel, or similar. The predetermined region may be set to different amounts manually, or a machine learning model may be trained to determine a predetermined region size for performing the adaptive threshold binarization. At an operation 254, the given pixel is corrected based on the threshold value. In other words, if the given pixel has a value below the predetermined threshold the pixel may be considered to be white or 0, and if the given pixel has a value above the predetermined threshold the pixel may be considered to be black, 1, or another predetermined maximum value as desired. The process 200 may be repeated for each pixel in the image (or at least every pixel of the optical code) so that the entire optical code may be corrected using the binarization. In various embodiments, a trained model may also identify portions of an optical code to which binarization should be applied, so that not the entire image or the entire optical may need to be binarized—thereby preserving computing resources and improving the functionality and efficiency of those computing resources. In various embodiments, a binarization step such as the process 200 (e.g., performed at the operation 168 of FIG. 1) may be performed iteratively multiple times on an image. After each binarization, an attempt to read the code in the image may be attempted until the reading is successful, or until a predetermined number of parameters have been tried or a predetermined number of binarizations have been tried. In this way, the system may attempt to read or decode optical codes with multiple binarization steps to increase the likelihood of successfully reading a code.

Figure 15:
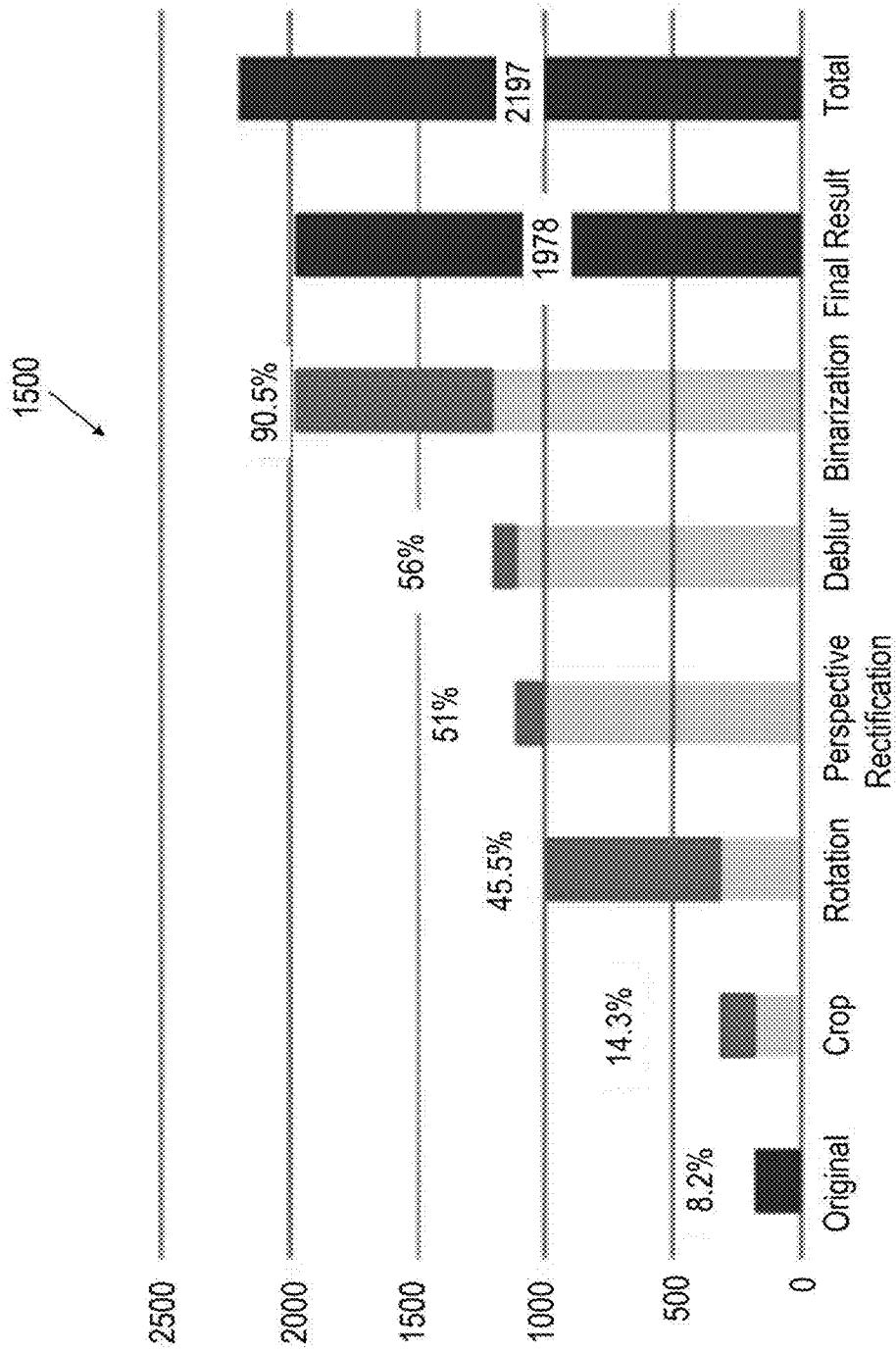
FIG. 15 shows a graph of experimental results of decoding optical codes in images performed in accordance with one or more embodiments of the present disclosure.

FIG. 15 shows a graph 1500 of experimental results of decoding optical codes in images performed in accordance with one or more embodiments of the present disclosure. In particular, a set of 2,197 varying images with optical codes therein was analyzed using the process described herein with respect to FIG. 1. As shown, varying levels of image processing resulted in more and more optical codes being successfully read by a ZXing code reader/scanner.

In particular, in an attempt to read all 2,197 of the images without processing, only 179 optical codes or 8.2% of the images were successfully read (e.g., at operation 152 of FIG. 1). In the analysis, those 179 images were then removed from further processing since they were successfully read. After cropping (e.g., operation 154 of FIG. 1), an additional 6.1% of the optical codes were successfully read/decoded. After rotation (e.g., operation 156 of FIG. 1), an additional 31.2% of the total optical codes were successfully read. Thus, after cropping, rotation, and perspective rectification (e.g., after operations 154, 156, and 158 and at operation 160 of FIG. 1), 51% of the optical codes were successfully read.

After deblurring (e.g., after operation 162 and at operation 164 of FIG. 1), an additional 5% of the optical codes were read. After binarization (e.g., after operation 168 and at operation 170), an additional 34.5% of the total images were read. As such, using the method of FIG. 1, 1,978 of 2,197, or 90.5%, of optical codes in the original image set were successfully read/decoded. Such a result is a significant improvement over other optical code detection methods where low-quality images are used. As such, it is possible in a dataset of user generated images of identification cards, to have more than 90%, or fewer than 10%, of optical codes that may be identified and read by the embodiments described herein. Further, the combinations of image processing steps described herein, the different orders for performing those steps, and the aspect of removing read images at intermediate or interim processing steps all yield embodiments that provide superior functionality and results as compared to prior methods.

As such, described herein are systems, methods, and computer readable media for recognizing optical codes in low quality images, such as images uploaded by users with cameras. Through a combination of cropping, rotating, perspective rectification, deblurring, and/or binarization, more optical codes may be read/decoded and those optical codes may be read/detected in a manner that is a more efficient use of computing resources than other methods.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

Figure 16:
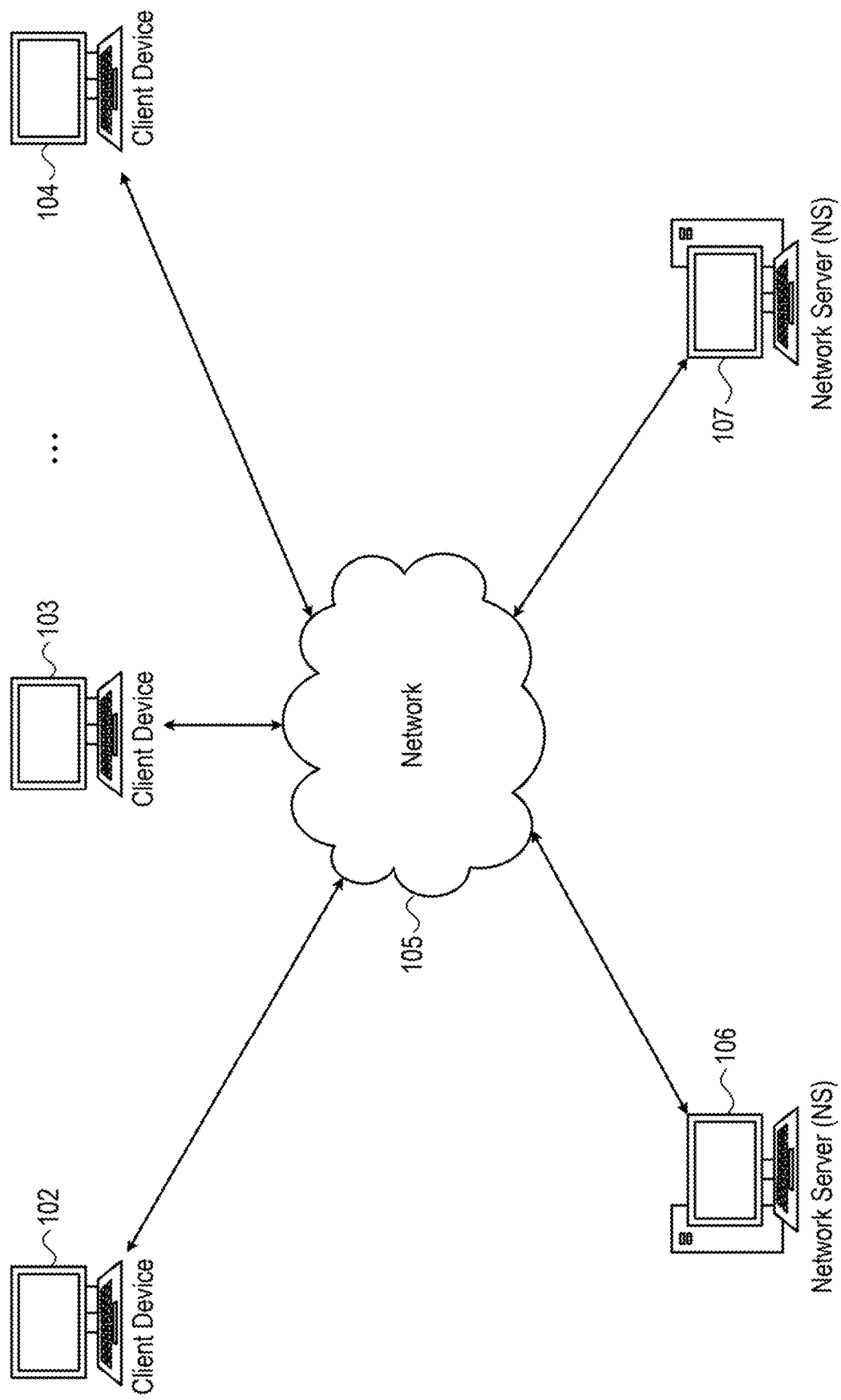
FIG. 16 is a block diagram depicting a computer-based system and platform in accordance with one or more embodiments of the present disclosure.

FIG. 16 is a block diagram depicting a computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 16, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 16, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 17:
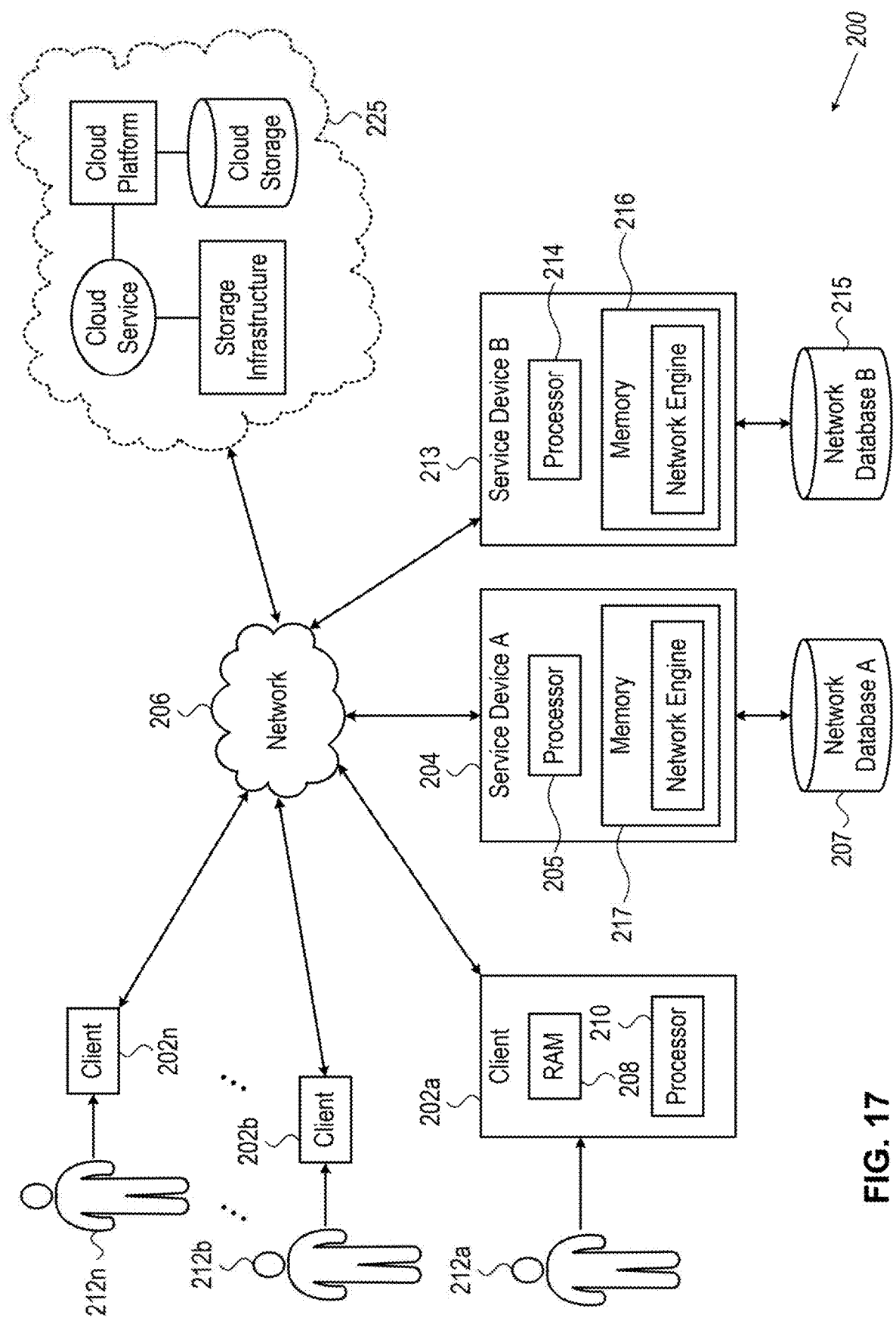
FIG. 17 is a block diagram depicting another computer-based system and platform in accordance with one or more embodiments of the present disclosure.

FIG. 17 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b through 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a through 202n may also comprise a number of external or internal devices such as a mouse, a CD-ROM, DVD, a physical or virtual keyboard, a display, or other input or output devices. In some embodiments, examples of member computing devices 202a through 202n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a through 202n may be specifically programmed with one or more application programs in accordance with one or more principles/methodologies detailed herein. In some embodiments, member computing devices 202a through 202n may operate on any operating system capable of supporting a browser or browser-enabled application, such as Microsoft™ Windows™, and/or Linux. In some embodiments, member computing devices 202a through 202n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202a through 202n, users 212a through 212n, may communicate over the exemplary network 206 with each other and/or with other systems and/or devices coupled to the network 206. As shown in FIG. 17, exemplary server devices 204 and 213 may be also coupled to the network 206. In some embodiments, one or more member computing devices 202a through 202n may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 18:
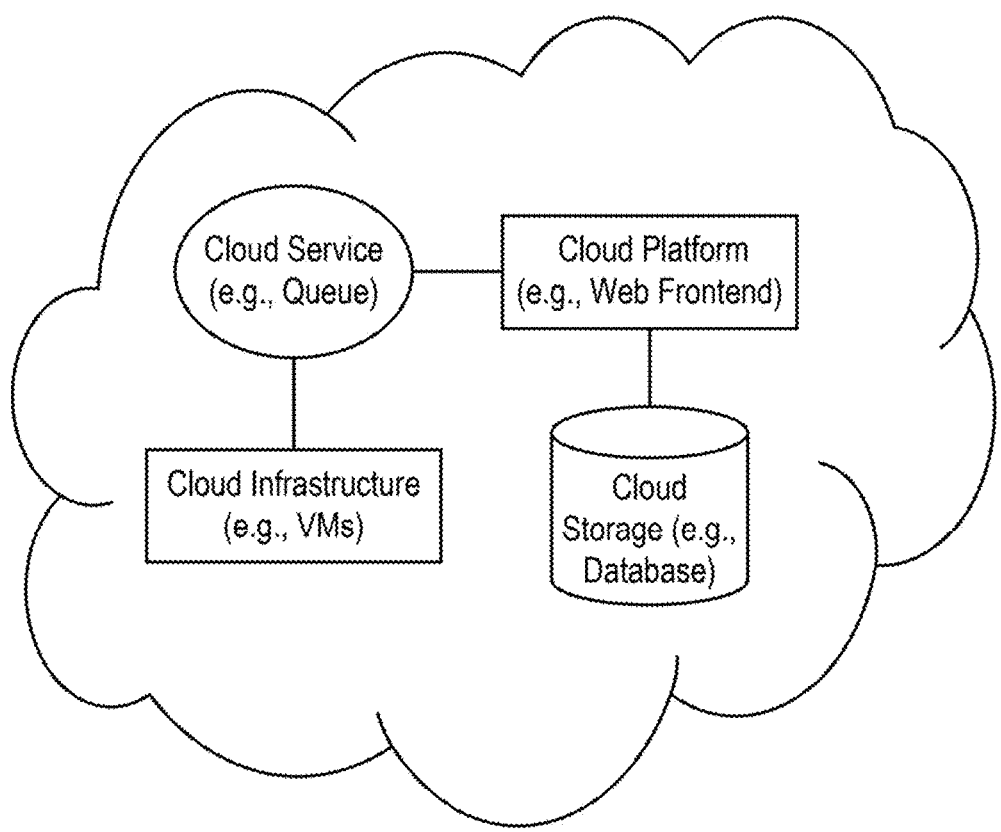
FIGS. 18 and 19 are diagrams illustrating implementations of cloud computing architecture/aspects with respect to which the disclosed technology may be specifically configured to operate, in accordance with one or more embodiments of the present disclosure.
Figure 19:
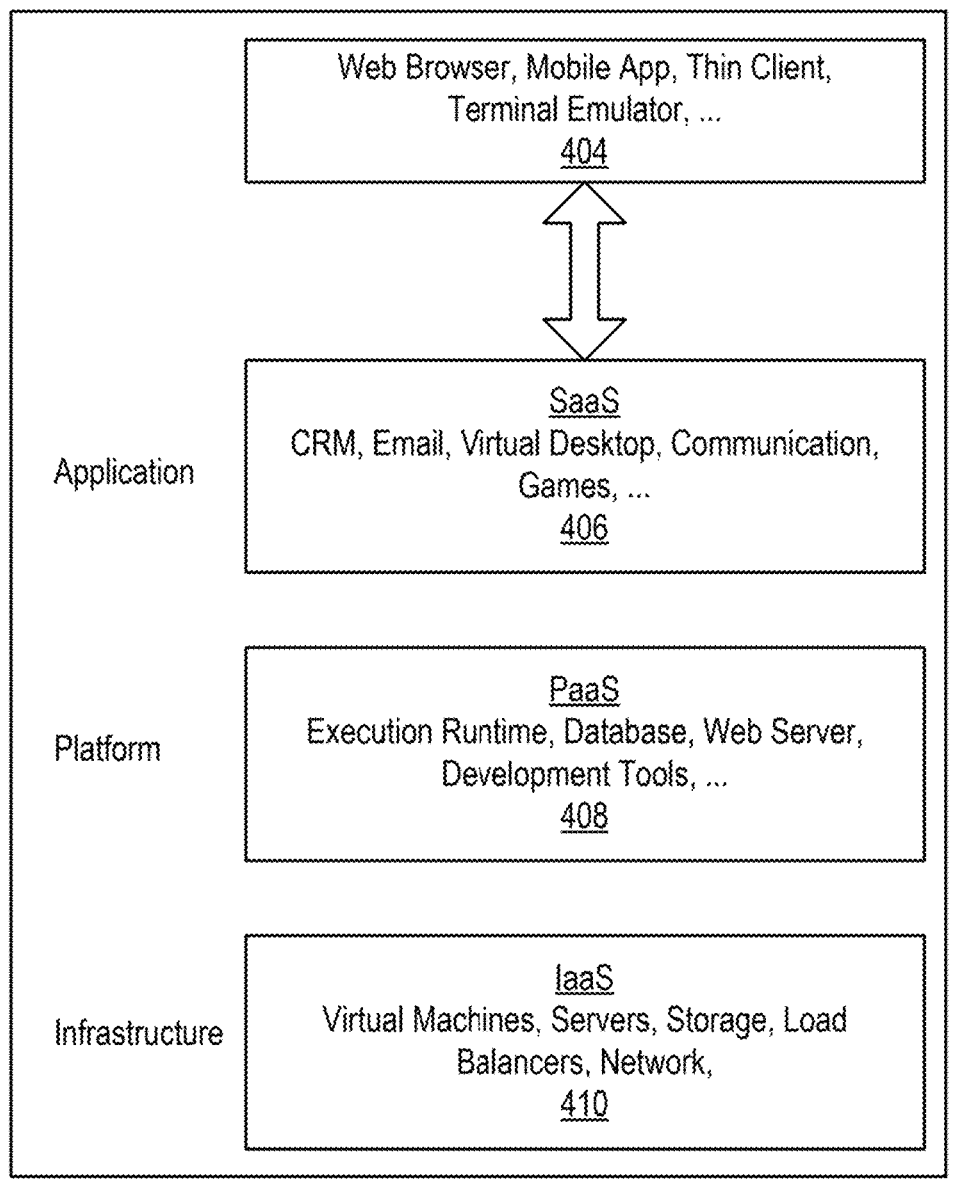

As also shown in FIGS. 17-19, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 19, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 18 and 19 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate.

At least some aspects of the present disclosure will now be described with reference to the following numbered clauses.

1. A method including:
    receiving, by a processor of a computing device, a plurality of images, where each of the plurality of images comprises an optical code;
    performing, by the processor, a first optical code reading process on the plurality of images to decode optical codes of a first subset of the plurality of images;
    cropping, by the processor, a second subset of the plurality of images that were not decoded during the first optical code reading process to isolate optical codes of the second subset of the plurality of images;
    rotating, by the processor, the second subset of the plurality of images to achieve a desired orientation for each of the optical codes of the second subset of the plurality of images;
    rectifying, by the processor, after the cropping and the rotating, a perspective of each of the second subset of the plurality of images to achieve a desired perspective angle for each of the optical codes of the second subset of the plurality of images;
    performing, by the processor, after the rectifying, a second optical code reading process on the second subset of the plurality of images to decode optical codes of a third subset of the plurality of images;
    deblurring, by the processor, after the second optical code reading process, a fourth subset of the plurality of images that were not decoded during the first optical code reading process or the second optical code reading process to reduce blurring in each of the fourth subset of the plurality of images;
    performing, by the processor after the deblurring, a third optical code reading process on the fourth subset of the plurality of images to decode optical codes of a fifth subset of the plurality of images;
    binarizing, by the processor, after the third optical code reading process, a sixth subset of the plurality of images that were not decoded during the first optical code reading process, the second optical code reading process, or the third optical code reading process to correct pixels of optical codes of the sixth subset of the plurality of images; and
    performing, by the processor after the binarizing, a fourth optical code reading process on the sixth subset of the plurality of images to decode optical codes of a seventh subset of the plurality of images.

2. The method of clause 1, where an eighth subset of the plurality of images were not decoded during the first optical code reading process, the second optical code reading process, the third optical code reading process, or the fourth optical code reading process.

3. The method of clause 2, where the eighth subset of the plurality of images represents less than ten percent of the plurality of images.

4. The method of clause 1, where the optical code of each of the plurality of images includes a stacked linear barcode.

5. The method of clause 4, where the stacked linear barcode is a portable data file 417 (PDF417) type barcode.

9. The method of clause 1, where the first optical code reading process, the second optical code reading process, the third optical code reading process, and the fourth optical code reading process are performed using a zebra crossing (ZXing) barcode scanning decoder.

10. The method of clause 1, where the binarizing comprises:
    performing an adaptive threshold binarization to determine a threshold value for a given pixel based on a predetermined region of pixels around the given pixel; and
    correcting the given pixel based on the threshold value.

11. A system including:
    a memory, storing computer instructions; and
    a processor coupled to the memory, when executing the computer instructions, the processor is programmed to:
    receive a plurality of images, where each of the plurality of images comprises an optical code;
    perform a first optical code reading process on the plurality of images to decode optical codes of a first subset of the plurality of images;
    crop a second subset of the plurality of images that were not decoded during the first optical code reading process;
    rotate the second subset of the plurality of images to achieve a desired orientation for each of the optical codes of the second subset of the plurality of images;
    rectify a perspective of each of the second subset of the plurality of images;
    perform a second optical code reading process on the second subset of the plurality of images to decode optical codes of a third subset of the plurality of images;
    deblur a fourth subset of the plurality of images that were not decoded during the first optical code reading process or the second optical code reading process;
    perform a third optical code reading process on the fourth subset of the plurality of images to decode optical codes of a fifth subset of the plurality of images;
    binarize a sixth subset of the plurality of images that were not decoded during the first optical code reading process, the second optical code reading process, or the third optical code reading process to correct pixels of each of optical codes of the sixth subset of the plurality of images; and
    perform a fourth optical code reading process on the sixth subset of the plurality of images to detected optical codes of a seventh subset of the plurality of images.

12. The system of clause 11, where the optical code of each of the plurality of images includes a stacked linear barcode.
13. The system of clause 11, where the deblurring of the fourth subset of the plurality of images includes performing a scale iterative upscaling neural-network (SIUN) deblurring process on the fourth subset of the plurality of images.
14. The system of clause 11, where the first optical code reading process, the second optical code reading process, the third optical code reading process, and the fourth optical code reading process are performed using a zebra crossing (ZXing) barcode scanning decoder.
15. The system of clause 11, where in order to binarize the sixth subset of the plurality of images, the processor is further configured to:
    perform an adaptive threshold binarization to determine a threshold value for a given pixel based on a predetermined region of pixels around the given pixel; and
    correct the given pixel based on the threshold value.
16. A non-transitory computer readable medium having instructions stored thereon that, upon execution by a computing device, cause the computing device to perform operations including:
    receiving a plurality of images, where each of the plurality of images comprises an optical code;
    cropping the plurality of images to isolate the optical code of each of the plurality of images;
    rotating the plurality of images to achieve a desired orientation for the optical code of each of the plurality of images;
    rectifying, after the cropping and the rotating, a perspective of each of the plurality of images to achieve a desired perspective angle for the optical code of each of the plurality of images;
    deblurring, after the rectifying, the plurality of images to reduce blurring in each of the plurality of images;
    binarizing, after the deblurring, the plurality of images to correct pixels of the optical code in each of the plurality of images; and
    performing, after the binarizing, an optical code reading process on the plurality of images to decode optical codes in the plurality of images.
17. The non-transitory computer readable medium of clause 16, where the optical codes of the plurality of images include a stacked linear barcode.
18. The non-transitory computer readable medium of clause 16, where the deblurring of the plurality of images includes performing a scale iterative upscaling neural-network (SIUN) deblurring process on the plurality of images.
19. The non-transitory computer readable medium of clause 16, where the optical code reading process is performed using a zebra crossing (ZXing) barcode scanning decoder.
20. The non-transitory computer readable medium of clause 16, where in order to binarize the plurality of images, the instructions further cause the computing device to perform operations comprising:
    performing an adaptive threshold binarization to determine a threshold value for a given pixel based on a predetermined region of pixels around the given pixel; and
    correcting the given pixel based on the threshold value.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 18 and 19) and cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux™, (2) Microsoft Windows™, (3) OS X (Mac OS), (4) Solaris™, (5) UNIX™ (6) VMWare™, (7) Android™, (8) Java Platforms™, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A non-transitory computer readable medium having instructions stored thereon that, upon execution by a computing device, cause the computing device to perform operations comprising:
receiving a plurality of images, wherein each of the plurality of images comprises an optical code;
cropping the plurality of images to isolate the optical code of each of the plurality of images to form a plurality of modified images, wherein each modified image lacks at least one cropped out portion previously present in each respective image of the plurality of images;
rotating the plurality of modified images to achieve a desired orientation for the optical code of each of the plurality of modified images;
rectifying, after the cropping and the rotating, a perspective of each of the plurality of modified images to achieve a desired perspective angle for the optical code of each of the plurality of modified images;
deblurring, after the rectifying, the plurality of modified images to reduce blurring in each of the plurality of modified images;
binarizing, after the deblurring, the plurality of modified images to correct pixels of the optical code in each of the plurality of modified images; and
performing, after the binarizing, an optical code reading process on the plurality of modified images to decode optical codes in the plurality of modified images.

2. The non-transitory computer readable medium of claim 1, wherein the optical codes of the plurality of images comprise a stacked linear barcode.

3. The non-transitory computer readable medium of claim 1, wherein the deblurring of the plurality of modified images comprises performing a scale iterative upscaling neural-network (SIUN) deblurring process on the plurality of modified images.

4. The non-transitory computer readable medium of claim 1, wherein the optical code reading process is performed using a zebra crossing (ZXing) barcode scanning decoder.

5. The non-transitory computer readable medium of claim 1, wherein in order to binarize the plurality of modified images, the instructions further cause the computing device to perform operations comprising:
performing an adaptive threshold binarization to determine a threshold value for a given pixel based on a predetermined region of pixels around the given pixel; and
correcting the given pixel based on the threshold value.

6. A system comprising:
a memory, storing computer instructions; and
a processor coupled to the memory, when executing the computer instructions, the processor is programmed to:
receive a plurality of images, wherein each of the plurality of images comprises an optical code;
perform a first optical code reading process on the plurality of images to decode optical codes of a first subset of the plurality of images;
crop a second subset of the plurality of images that were not decoded during the first optical code reading process to modify the second subset of the plurality of images, wherein each of the second subset of the plurality of images thereby lacks at least one cropped out portion previously present in each image prior to being cropped;
rotate the second subset of the plurality of images to achieve a desired orientation for each of the optical codes of the second subset of the plurality of images;
rectify a perspective of each of the second subset of the plurality of images;
perform a second optical code reading process on the second subset of the plurality of images to decode optical codes of a third subset of the plurality of images;
deblur a fourth subset of the plurality of images that were not decoded during the first optical code reading process or the second optical code reading process;
perform a third optical code reading process on the fourth subset of the plurality of images to decode optical codes of a fifth subset of the plurality of images;
binarize a sixth subset of the plurality of images that were not decoded during the first optical code reading process, the second optical code reading process, or the third optical code reading process to correct pixels of each of optical codes of the sixth subset of the plurality of images; and
perform a fourth optical code reading process on the sixth subset of the plurality of images to detected optical codes of a seventh subset of the plurality of images.

7. The system of claim 6, wherein the optical code of each of the plurality of images comprises a stacked linear barcode.

8. The system of claim 6, wherein the deblurring of the fourth subset of the plurality of images comprises performing a scale iterative upscaling neural-network (SIUN) deblurring process on the fourth subset of the plurality of images.

9. The system of claim 6, wherein the first optical code reading process, the second optical code reading process, the third optical code reading process, and the fourth optical code reading process are performed using a zebra crossing (ZXing) barcode scanning decoder.

10. The system of claim 6, wherein in order to binarize the sixth subset of the plurality of images, the processor is further configured to:
perform an adaptive threshold binarization to determine a threshold value for a given pixel based on a predetermined region of pixels around the given pixel; and
correct the given pixel based on the threshold value.

11. A method comprising:
receiving, by a processor of a computing device, a plurality of images, wherein each of the plurality of images comprises an optical code;
performing, by the processor, a first optical code reading process on the plurality of images to decode a first subset of optical codes of a first subset of images of the plurality of images;
cropping, by the processor, a second subset of images of the plurality of images that remains unread after the first optical code reading process to isolate a second set of optical codes of the second subset of images of the plurality of images, wherein the cropping comprises modifying the second subset of the plurality of images, wherein each of the second subset of the plurality of images thereby lacks at least one cropped out portion previously present in each image prior to being cropped;

rotating, by the processor, the second subset of images to achieve a desired orientation for each of the second subset of optical codes of the second subset of images;

rectifying, by the processor, after the cropping and the rotating, a perspective of each of the second subset of images to achieve a desired perspective angle for each of the second subset of optical codes of the second subset of images;

performing, by the processor, after the rectifying, a second optical code reading process on the second subset of images to decode the second subset of optical codes of a third subset of images of the plurality of images;

deblurring, by the processor, after the second optical code reading process, a fourth subset of images of the plurality of images that remains unread after the first optical code reading process or the second optical code reading process to reduce blurring in each of the fourth subset of images;

performing, by the processor after the deblurring, a third optical code reading process on the fourth subset of images to decode a fifth subset of optical codes of a fifth subset of images of the plurality of images;

binarizing, by the processor, after the third optical code reading process, a sixth subset of images of the plurality of images that remains unread after the first optical code reading process, the second optical code reading process, or the third optical code reading process, to correct pixels of the sixth subset of optical codes of the sixth subset of images; and performing, by the processor, after the binarizing, a fourth optical code reading process on the sixth subset of images to decode a seventh subset of optical codes of a seventh subset of images of the plurality of images.

12. The method of claim 11, wherein an eighth subset of images of the plurality of images remains unread after the first optical code reading process, the second optical code reading process, the third optical code reading process, or the fourth optical code reading process.

13. The method of claim 12, wherein the eighth subset of images represents less than ten percent of the plurality of images.

14. The method of claim 11, wherein the optical code of each of the plurality of images comprises a stacked linear barcode.

15. The method of claim 14, wherein the stacked linear barcode is a portable data file 417 (PDF417) type barcode.

16. The method of claim 11, wherein the deblurring of the fourth subset of the plurality of images comprises performing a scale iterative upscaling neural-network (SIUN) deblurring process on the fourth subset of images.

17. The method of claim 11, wherein the rectifying of the perspective of each of the second subset of images comprises locating a plurality of corner points of each of the second subset of optical codes of the second subset of images and using the plurality of corner points to correct an aspect ratio of the second subset of images.

18. The method of claim 11, wherein the desired orientation of each of the optical codes of the second subset of images comprises a horizontal orientation.

19. The method of claim 11, wherein the first optical code reading process, the second optical code reading process, the third optical code reading process, and the fourth optical code reading process are performed using a zebra crossing (ZXing) barcode scanning decoder.

20. The method of claim 11, wherein the binarizing comprises:
performing an adaptive threshold binarization to determine a threshold value for a given pixel based on a predetermined region of pixels around the given pixel; and
correcting the given pixel based on the threshold value.

* * * * *